Aug. 30, 1960  V. C. KENNEDY, JR  2,950,910
VEHICLE WEIGHING SYSTEM
Filed April 17, 1957
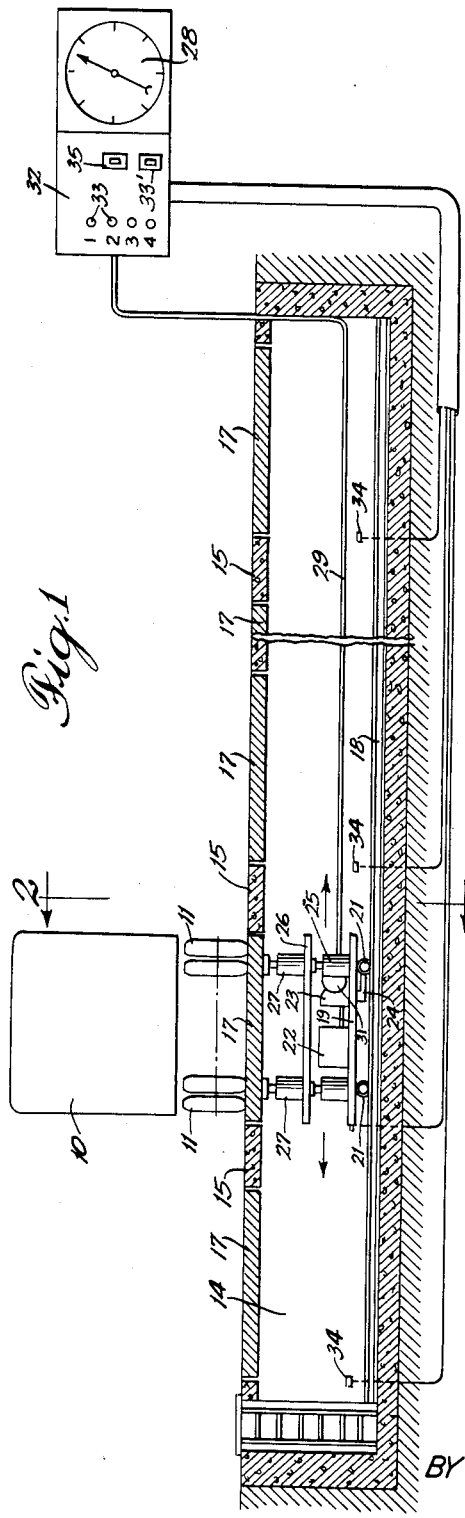
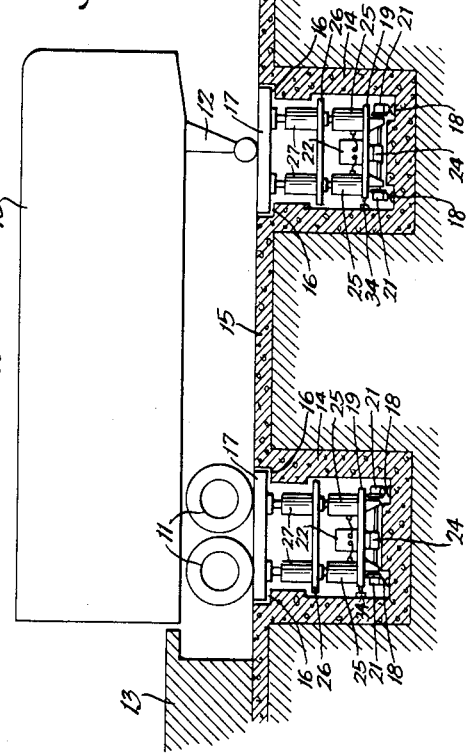
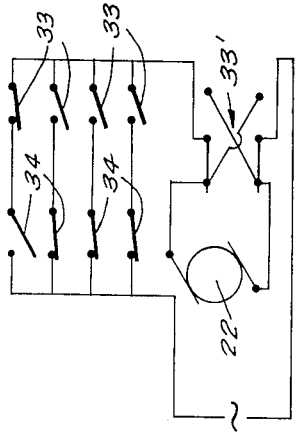
INVENTOR:
Verne C. Kennedy,
BY *Blair Freeman & Molinare*
ATTORNEYS.

United States Patent Office 2,950,910
Patented Aug. 30, 1960

2,950,910

VEHICLE WEIGHING SYSTEM

Verne C. Kennedy, Jr., Chicago, Ill., assignor to Streeter-Amet Company, Grayslake, Ill., a corporation of Illinois Filed Apr. 17, 1957, Ser. No. 653,353

3 Claims. (Cl. 265—72)

This invention relates to a vehicle weighing system and more particularly to a multiple lane system for weighing vehicles such as trucks in any one of a plurality of lanes.

In many instances, such as around truck loading docks, it is desirable to be able to weight trucks, trailers, or like vehicles, in a plurality of different lanes. If each lane is equipped with a separate weighing system, the installation becomes extremely expensive and portable weighing units are difficult to use and are not satisfactory.

It is therefore one of the objects of the present invention to provide a weighing system in which vehicles can be weighed in any one of a plurality of lanes with a minimum amount of equipment and in a rapid and easy manner.

Another object is to provide a weighing system in which weight sensing means is carried by cars selectively shiftable in tunnels to positions in registry with any one of a plurality of platforms in different lanes selectively to weigh the vehicles supported on the platforms.

According to a feature of the invention, a plurality of platforms are spaced along the length of each tunnel to receive a single set of wheels or the wheels of a single truck on a vehicle and jacks are carried by the platforms or by the cars to elevate the platforms and support them on the weight sensing means carried by the cars.

A further object is to provide a vehicle weighing system in which the weight is indicated at a control station outside of the tunnels and the cars are positioned and operation of the jacks controlled remotely from the control station. For this purpose the cars are connected to the control station through flexible cables through which the weight information is transmitted and control impulses for the jacks and for selective movement of the cars are transmitted.

The above and other objects and features of the invention will be more readily apparent from the following description when read in connection with the accompanying drawing, in which:

Fig. 1 is a sectional view lengthwise of a tunnel illustrating a vehicle weighing system embodying the invention;

Figure 2 is a similar sectional view transverse to the tunnels; and

Figure 3 is a diagram of the control circuit.

The system, as illustrated, is adapted to weight conventional highway trailers, as generally indicated at 10, which may have a rear truck supported on spaced axles and carrying two sets of wheels 11 on each side of the truck, plus a front support 12 spaced from the rear truck toward the front of the trailer. To weigh trailers of this type the several wheels 11 of the rear truck are supported on a single weighing platform and the front supports 12 are supported on a separate platform. As shown in Figure 2, the truck may be weighed while it is adjacent a loading dock 13 being loaded or unloaded so that net weight of the load can easily be obtained by weighing the truck either before it is loaded or after it is unloaded and the gross weight can also be obtained.

For the purpose of weighing vehicles of this nature, tunnels 14 are provided depressed beneath the ground level or pavement level, as indicated at 15, and spaced apart a distance equal to the spacing between the rear truck and front support of the vehicle. It will be apparent that in vehicles having three or more sets of wheels or supports an equal number of tunnels correspondingly spaced could be provided for weighing.

The tunnels, as shown, may be formed of concrete or similar structural material and are provided near their tops with supporting shoulders 16 on which platforms 17 may be supported with their upper surfaces substantially flush with the ground or pavement level, as shown at 15. Thus, when the apparatus is not in use the platforms close the tops of the tunnels and present a smooth continuous surface over which the vehicles may travel.

There are a plurality of platforms 17 spaced lengthwise along each tunnel 14, as shown in Figure 1, corresponding to different lanes in which the vehicles may travel or be parked so that a vehicle in any one of the several lanes may be wholly supported by platforms 17 for weighing.

To weigh the vehicles each tunnel in its lower portion carries tracks 18 on which cars 19 may travel. The cars may be provided with two axles carrying flanged wheels 21 similar to small railway cars and one of the axles may be driven by a motor 22 through a speed reducer 23 and a driving connection indicated generally at 24. In this way, the cars can be moved along the tracks 18 to positions selectively registering with any one of the several platforms 17 to weigh a vehicle supported on that particular platform.

Each car carries a plurality of load cells 25 preferably positioned near the corners of the car and supporting a second platform 26. The load cells may be conventional electric cells which will produce an electrical effect, such as a resistance, varying in response to the load supported thereby so that by indicating the electrical effect, the total load supported on the cells may be measured.

Each platform 26 also supports a plurality of hydraulic jacks 27 preferably four in number, positioned adjacent to the corners of the platform to engage the platform 17 beneath which the car is stationed and elevate it so that the load supported thereon will be transferred to the load cells to be measured thereby. It will be understood that the jacks can be carried by the platforms 17, but the arrangement illustrated is preferred since it minimizes the number of jacks required.

The weight is indicated at a remote indicating and control station outside of the tunnels on a conventional indicating meter 28. The instrument 28 may be any conventional type of electrical indicating or recording device and is merely illustrated diagrammatically herein. Impulses from the load cells are transmitted to the instrument 28 through a flexible cable 29 extending from each of the cars to the indicating and control station. Preferably each car carries a reel 31 on which the cable is wound or unwound as the car moves in the tunnel so that no loose cable will ever lie in the tunnel.

Movement of the cars and operation of the jacks is also controlled from the indicating and control station through a control panel shown at 32. The panel may be provided with switches, as illustrated at 33, and with a reversing switch 33′ which may be selectively operated to cause the car to move to any one of the several lanes occupied by a vehicle to be weighed. The switches may be connected through the cable 29 to the motor 22 to energize it in one direction or the other and are preferably in circuit with limit switches 34 positioned in the tunnel to be engaged by the car or by the cam projection thereon to interrupt the circuit and stop the car when it is in the desired selected position. The control circuit is illustrated diagrammatically in Figure 3 wherein the switches 33 and 34 are shown connected in series with each other in pairs and through the reversing switch 33' to the motor 22. The switches 33 are normally open except for the selected switch which is closed to position the carriage and the switches 34 are normally closed except for the switch which is engaged by the carriage and held open. In the position shown in Figure 3 the switch 33 which is closed to select the desired position of the carriage is in circuit with the switch 34 which is opened by the carriage so that the motor 22 is de-energized and the carriage is stationary. To move the carriage to a different position, one of the open switches 33 may be closed to complete a circuit through the reversing switch 33' and the motor. The motor will therefore operate in one direction to move the carriage in the proper direction toward the limit switch 34 which is in series with the closed switch 33. When the carriage reaches that limit switch it will open the switch 34 to stop the motor and the carriage will remain in the selected position until a further position is selected. With this arrangement, when any one of the selector switches 33 is operated, unless the car is already in the selected position so that the limit switch 34 corresponding to that position is open, the motor 22 will be energized to drive the car to the selected position. When in that position, the car will engage and open the corresponding limit switch 34 to stop the motor. Thereupon the jacks may be operated through a control switch 35 which may operate a separate motor and pump on each car to raise the jacks and elevate the platform 17 which is then above the car. At this time an indication or record of the weight supported on the platforms is attained at the indicating and control station.

While one embodiment of the invention has been shown and described herein, it will be understood that it is illustrative only and not to be taken as a definition of the scope of the invention, reference being had for this purpose to the appended claims.

What is claimed is:

1. A vehicle weighing system comprising a plurality of spaced parallel tunnels corresponding in number and spacing to the sets of wheels on a vehicle to be weighed, a plurality of platforms spaced lengthwise of each of the tunnels to receive the sets of wheels of a vehicle at different weighing stations lengthwise of the tunnels, a car movable lengthwise in each of the tunnels, a motor on each car to move it along its tunnel, control means for each motor including switches positioned along the tunnel to be engaged by the car and to stop the car selectively beneath the platforms, weight sensing means carried by each car, jack means operatively connected to the cars and platforms to elevate the platform above a car and support it on the weight sensing means, an indicator outside of the tunnel at a control station connected to the weight sensing means, and controls for the motors and jack means at the control station.

2. A vehicle weighing system comprising a plurality of spaced parallel tunnels corresponding in number and spacing to the sets of wheels on a vehicle to be weighed, a plurality of platforms spaced lengthwise of each of the tunnels to receive the sets of wheels of a vehicle at different weighing stations lengthwise of the tunnels, a car movable lengthwise in each of the tunnels, a motor on each car to move it along its tunnel, control means for each motor including switches positioned along the tunnel to be engaged by the car and to stop the car selectively beneath the platforms, weight sensing means carried by each car, jack means operatively connected to the cars and platforms to elevate the platform above a car and support it on the weight sensing means, an indicator outside of the tunnels at a control station, selector switches at the control station included in the control means, and flexible cables extending from the control station to each of the cars and including conductors connecting the indicator to the weight sensing means and conductors connecting the selector switches to the motors.

3. A vehicle weighing system comprising a plurality of spaced parallel tunnels corresponding in number and spacing to the sets of wheels on a vehicle to be weighed, a plurality of platforms spaced lengthwise of each of the tunnels to receive the sets of wheels of a vehicle at different weighing stations lengthwise of the tunnels, a car movable lengthwise in each of the tunnels, an electric motor on each car to move it selectively to positions beneath the platforms, weight sensing electrical load cells carried by each car, jacks carried by each car in vertical series with the load cells to elevate the platform above a car and support it on the load cells, electrical operating means for the jacks on each car, an indicator outside of the tunnels at a control station, controls for the electric motors and the jack operating means at the control station, and flexible electrical connections between the control station and the cars connecting the jack operating means and the electric motors to the controls and connecting the indicator to the load cells.

References Cited in the file of this patent

UNITED STATES PATENTS

| | | |
|---|---|---|
| 1,821,661 | Miller | Sept. 1, 1931 |
| 1,973,605 | Buettell et al. | Sept. 11, 1934 |
| 2,047,038 | Smith | July 7, 1936 |

FOREIGN PATENTS

| | | |
|---|---|---|
| 7,764 | Great Britain | Feb. 6, 1901 |
| 1,119,304 | France | Apr. 3, 1956 |